(12) United States Patent
Nakamatsu (10) Patent No.: US 10,585,213 B2
(45) Date of Patent: Mar. 10, 2020

(54) OPTICAL ELEMENT AND DISPLAY DEVICE

(71) Applicant: Sharp Kabushiki Kaisha, Sakai, Osaka (JP)

(72) Inventor: Kenichiro Nakamatsu, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 138 days.

(21) Appl. No.: 15/125,284

(22) PCT Filed: Aug. 21, 2014

(86) PCT No.: PCT/JP2014/071822
§ 371 (c)(1),
(2) Date: Sep. 12, 2016

(87) PCT Pub. No.: WO2015/136733
PCT Pub. Date: Sep. 17, 2015

(65) Prior Publication Data
US 2017/0123110 A1    May 4, 2017

(30) Foreign Application Priority Data
Mar. 14, 2014 (JP) .................................. 2014-052041

(51) Int. Cl.
G02B 1/118 (2015.01)
G02B 27/00 (2006.01)
G02B 1/14 (2015.01)

(52) U.S. Cl.
CPC ................ *G02B 1/118* (2013.01); *G02B 1/14* (2015.01); *G02B 27/0006* (2013.01)

(58) Field of Classification Search
CPC ........... G02B 1/111; G02B 1/118; G02B 1/14; G02B 27/0006
See application file for complete search history.

(56) References Cited

U.S. PATENT DOCUMENTS

2007/0141114 A1* 6/2007 Muisener ............. C09D 5/1693
424/427
2010/0038606 A1* 2/2010 Inoue ..................... B82Y 30/00
252/586

(Continued)

FOREIGN PATENT DOCUMENTS

JP        2007-004201 A     1/2007
JP        2008-051847 A     3/2008

(Continued)

OTHER PUBLICATIONS

International Search Report PCT/ISA/210 for International Application No. PCT/JP2014/071822 dated Sep. 8, 2014.

*Primary Examiner* — Sophie Hon
(74) *Attorney, Agent, or Firm* — Harness, Dickey & Pierce, P.L.C.

(57) ABSTRACT

The present invention provides an optical element which prevents a contaminant component adhering to the edge thereof from spreading through the capillary action and thus from forming a stain; and a display device including the element. The present invention directs to an optical element including: a base material including a front surface provided with projected portions at a pitch equal to or shorter than the wavelength of visible light, and a side surface surrounding the front surface; and a covering material covering at least one of an edge of the front surface and the side surface, the covering material filling gaps between the projected portions. The present invention also directs to a display device including such an optical element.

4 Claims, 8 Drawing Sheets

(56) References Cited

U.S. PATENT DOCUMENTS

| | | | |
|---|---|---|---|
| 2010/0166950 A1* | 7/2010 | Nieminen | B29D 11/00865 427/163.1 |
| 2010/0284087 A1 | 11/2010 | Yamada et al. | |
| 2011/0002041 A1 | 1/2011 | Tazawa | |
| 2011/0170041 A1* | 7/2011 | Sakai | G02B 5/3016 349/96 |
| 2011/0235181 A1* | 9/2011 | Hayashibe | G02B 1/118 359/577 |
| 2012/0045954 A1* | 2/2012 | Bleecher | C09K 3/18 442/80 |
| 2012/0147303 A1* | 6/2012 | Yamada | G02B 1/11 349/96 |
| 2013/0045371 A1* | 2/2013 | O'Donnell | B32B 7/02 428/215 |
| 2013/0285539 A1* | 10/2013 | Kim | H05B 33/12 313/504 |
| 2013/0319522 A1* | 12/2013 | Koike | H01L 31/02366 136/256 |
| 2013/0342927 A1* | 12/2013 | Hino | G02B 5/201 359/891 |
| 2014/0098422 A1 | 4/2014 | Fukuda et al. | |
| 2015/0015813 A1* | 1/2015 | Yoshinari | C07D 251/24 349/12 |

FOREIGN PATENT DOCUMENTS

| | | |
|---|---|---|
| JP | 2011-028229 A | 2/2011 |
| JP | 2014-089308 A | 5/2014 |
| WO | WO-2009/110139 A1 | 9/2009 |
| WO | WO-2010/150615 A1 | 12/2010 |
| WO | WO-2012/077738 A1 | 6/2012 |
| WO | WO-2012/133946 A1 | 10/2012 |

* cited by examiner

OPTICAL ELEMENT AND DISPLAY DEVICE

TECHNICAL FIELD

The present invention relates to optical elements and display devices. More specifically, the present invention relates to an optical element provided on the front surface with projected portions having a size equal to or smaller than the wavelength of visible light, and thus achieving a low reflectance; and a display device including the element.

BACKGROUND ART

Figure 11:
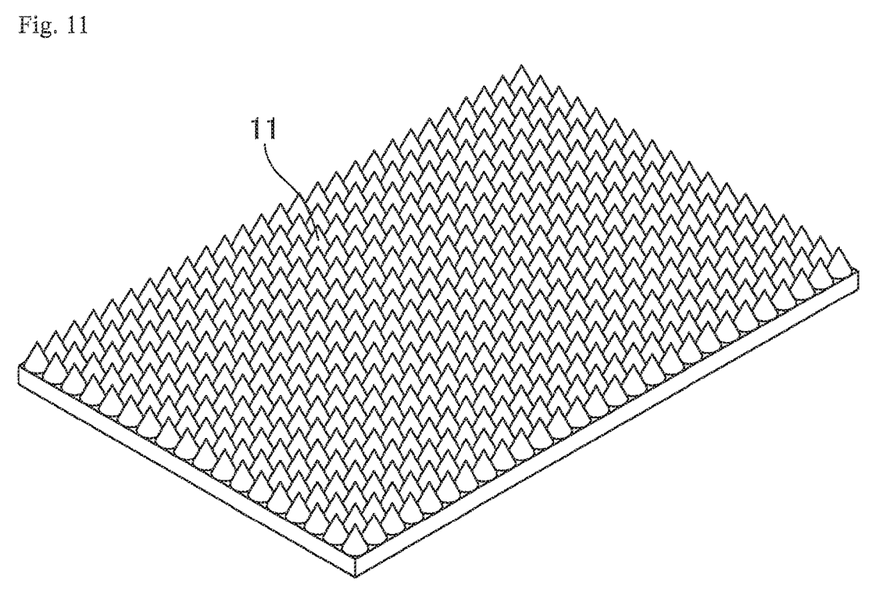
FIG. 11 is a perspective view illustrating a film having a conventional moth-eye structure.

Known optical elements are films on which a "moth-eye structure", a kind of nanometer-sized projection and recess structure (nanostructure), is formed (e.g. Patent Literatures 1 to 5). FIG. 11 is a perspective view illustrating a film having a conventional moth-eye structure. As illustrated in FIG. 11, the moth-eye structure may be one including many nanometer-sized cone-shaped projections on the front surface of a base material 11, for example. Such a moth-eye structure has a continuously changing refractive index from the air layer to the base material to cause the front surface of the base material 11 to be non-optical for incident light, significantly reducing the reflected light.

CITATION LIST

Patent Literature

Patent Literature 1: JP 2007-4201 A
Patent Literature 2: JP 2008-51847 A
Patent Literature 3: WO 2009/110139 A
Patent Literature 4: JP 2011-28229 A
Patent Literature 5: WO 2012/133946 A

SUMMARY OF INVENTION

Technical Problem

Conventional films with a nanostructure on the front surface, however, have been found to be problematic in handleability. That is, in studies aiming at practical use of a film having a nanostructure on the front surface, the inventor of the present invention has found that a stain often spreads from the edge of a film toward the inner side. As a result of investigating the cause thereof, the inventor has found that contaminants can adhere to a side surface because the nanostructure on the side surface of the film is exposed while the front surface of the film is usually covered with a protective film for purposes such as retention of optical properties. The inventor has then found that even when a small amount of contaminants adheres only to the side surface, a fine structure such as a nanostructure causes the capillary action through which components in the contaminants penetrate the side surface of the film to spread toward the inside of the film, thereby forming a large stain. The inventor has also found that the substances responsible for such a stain include sebum and ultraviolet-curable resins (in particular, plasticizers of specific kinds contained in resins) for panel attachment.

The above stains peculiar to a nanostructure have special properties that are different from typical stains as described below and that have not been recognized before. That is, the verification studies show that when a film having a nanostructure on which the stains are generated is left to stand after the protective film is peeled off to expose the front surface of the film, the stains peculiar to a nanostructure disappear. For example, when a film including a large stain with a width of 8 mm and a penetration depth of 4 mm was left to stand at room temperature for 48 hours in a laboratory, the stain became fainter to be practically invisible to the naked eye. This is presumably because the nanostructured projections, continuously formed in the film, allow the stain components to spread between the nanostructured projections with time, so that the stain appears to have disappeared. The part where the stain was generated in the moth-eye structure, a kind of nanostructure, was observed with an electron microscope before and after standing at room temperature. Before standing, the height of the projections of the moth-eye structure was found to be small due to the stain components filling the gaps between the projections in the moth-eye structure. In contrast, after standing for 48 hours in a laboratory, the height and shape of the projections of the moth-eye structure were substantially the same as those in normal parts where no stain was generated. In this manner, in the parts where the stain disappeared in observation by the naked eye, the shape of the projections was comparable to that in the normal parts and defects in the moth-eye structure (e.g. breaking of projections, sticking between the projections) were not observed, meaning that the parts were found to be back to the normal state microscopically.

Furthermore, in order to determine the relation between the disappearance of a stain and optical properties, four samples in which a stain was generated were randomly selected, and the reflectance and chromaticity before and after the disappearance of the stain were measured. The measurement was performed by the following procedure.

(1) Four samples with tough greasy dirt were randomly picked up.

(2) A film only was peeled off from a liquid crystal display device, and attached to a black acrylic plate.

(3) The reflection spectra of a normal part and a stain-generated part (stain-generated state) were measured with 5° specular reflection.

(4) After the samples were left to stand at room temperature for a certain period of time, the stain in each sample was confirmed by visual observation to have become fainter. Then, the reflection spectrum of the stain-generated part where the stain became fainter (stain-disappeared state) was measured with 5° specular reflection.

Figure 12:
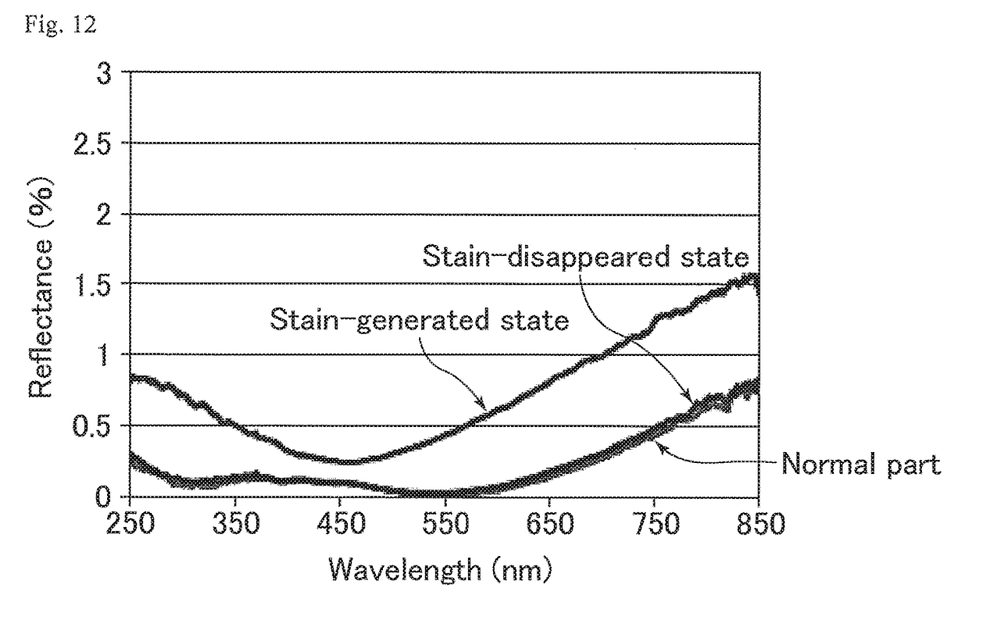
FIG. 12 is a graph showing the results of measuring a specular reflection spectrum before and after disappearance of a stain in a first stain-generated part of the film having a conventional moth-eye structure.
Figure 13:
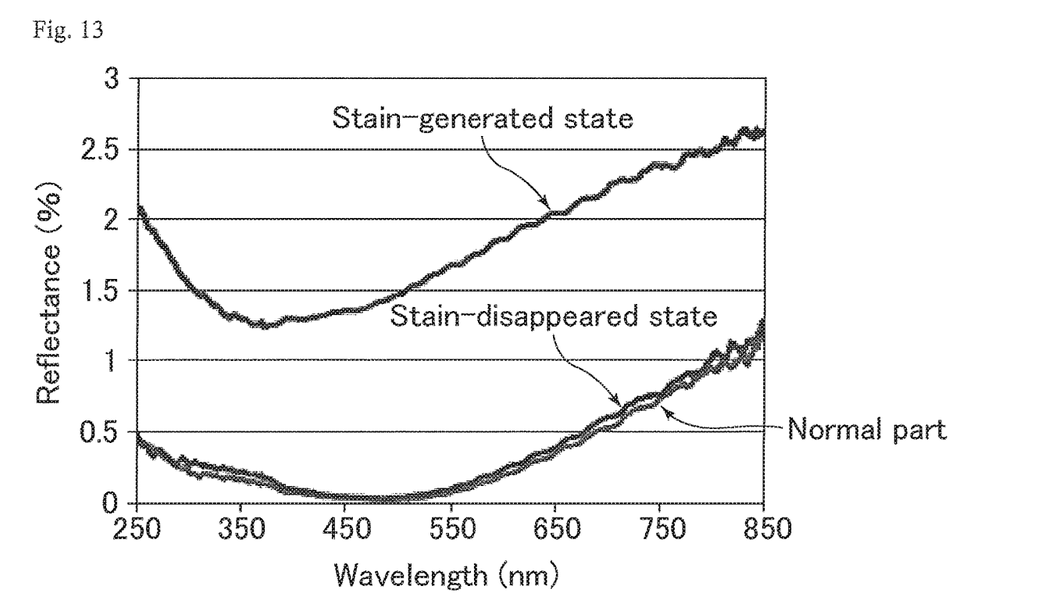
FIG. 13 is a graph showing the results of measuring a 5° specular reflection spectrum before and after disappearance of a stain in a second stain-generated part of the film having a conventional moth-eye structure.
Figure 14:
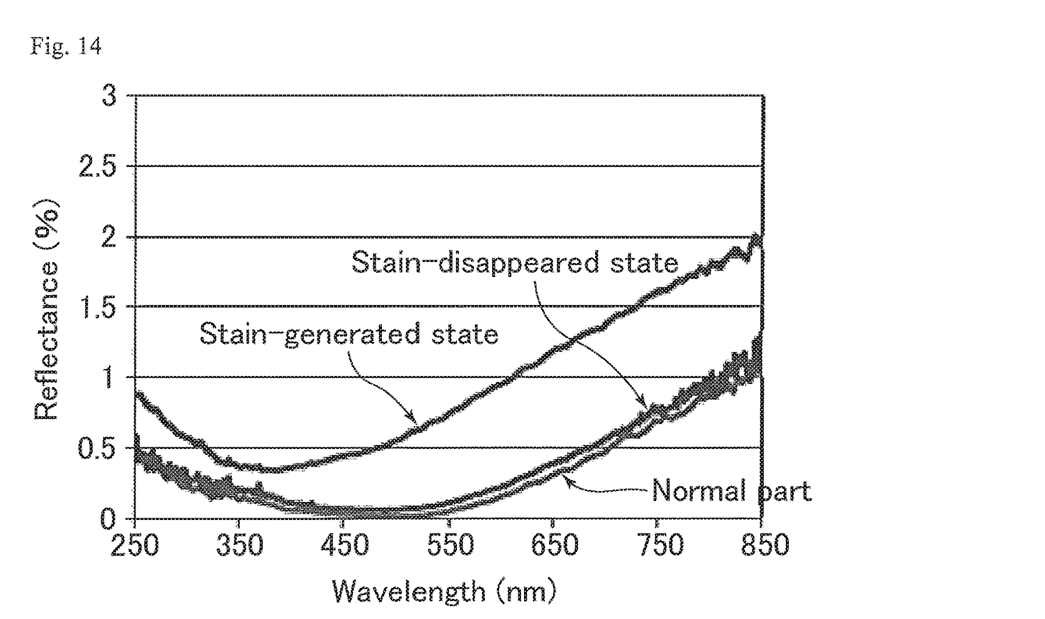
FIG. 14 is a graph showing the results of measuring a 5° specular reflection spectrum before and after disappearance of a stain in a third stain-generated part of the film having a conventional moth-eye structure.
Figure 15:
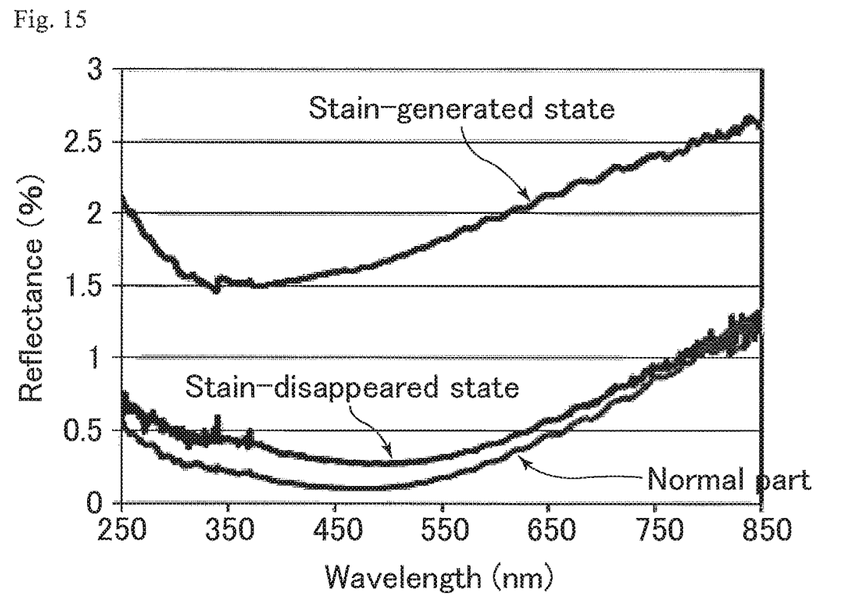
FIG. 15 is a graph showing the results of measuring a 5° specular reflection spectrum before and after disappearance of a stain in a fourth stain-generated part of the film having a conventional moth-eye structure.
Figure 16:
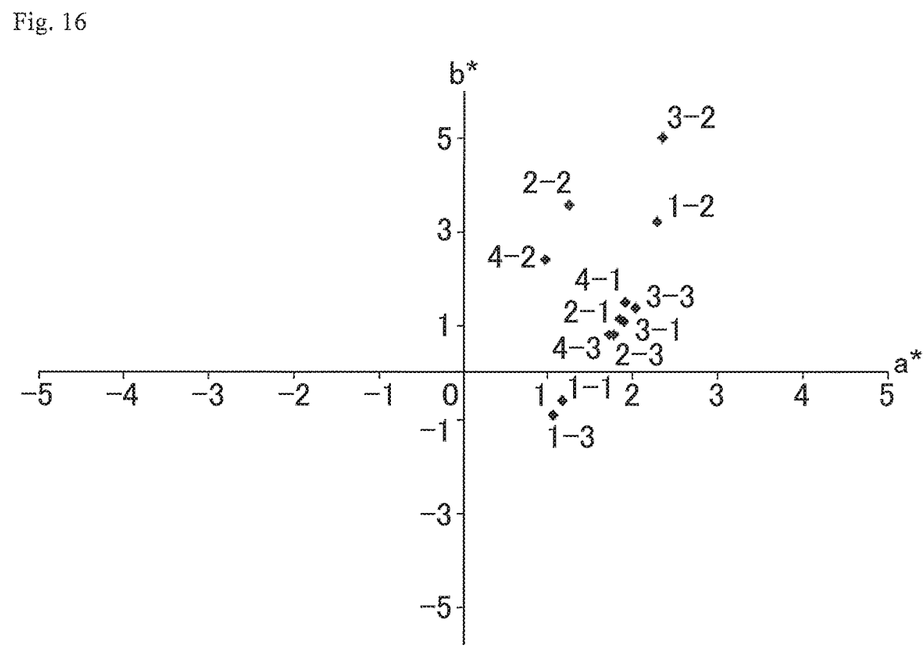
FIG. 16 is a graph showing the results of measuring chromaticity before and after disappearance of the stain in the first to fourth stain-generated parts of the film having a conventional moth-eye structure.

FIGS. 12 to 16 show the measurement results. FIG. 12 is a graph showing the results of measuring a 5° specular reflection spectrum before and after disappearance of a stain in a first stain-generated part of the film having a conventional moth-eye structure. FIG. 13 is a graph showing the results of measuring a 5° specular reflection spectrum before and after disappearance of a stain in a second stain-generated part of the film having a conventional moth-eye structure. FIG. 14 is a graph showing the results of measuring a 5° specular reflection spectrum before and after disappearance of a stain in a third stain-generated part of the film having a conventional moth-eye structure. FIG. 15 is a graph showing the results of measuring a 5° specular reflection spectrum before and after disappearance of a stain in a fourth stain-generated part of the film having a conventional moth-eye structure. FIG. 16 is a graph showing the results of measuring chromaticity before and after disappearance of the stain in the first to fourth stain-generated parts of the film having a conventional moth-eye structure. In the "X-Y" notation in FIG. 16, X represents one of the first to fourth stain-generated part numbers and Y is any one of 1 to 3, with 1 representing a normal part, 2 representing a stain-generated state, and 3 representing a stain-disappeared state. For example, "3-2" in FIG. 16 represents a measurement result of the third stain-generated part in the stain-generated state.

As is clear from the results shown in FIGS. 12 to 15, when the stains have become fainter and disappeared, the reflection spectrum is substantially the same as the spectrum of the normal part, which means that the reflectance has been sufficiently reduced. Also, as is clear from the results shown in FIG. 16, when the stains have become fainter and disappeared, the chromaticity (a*b*) has also been back to the value close to that in the normal part. Hence, the part with a stain having become fainter and disappeared shows a result comparable to the normal part, and thus does not affect the quality of the film.

As described above, the stains peculiar to a nanostructure have a tendency to disappear when the front surface of the film is left to stand while being exposed to the air. This tendency has probably not been found before, and even if it has been found, the means to deal with the tendency has not been found. For example, Patent Literatures 1 to 3 do not include any statements focusing on the stains peculiar to a nanostructure, and did not solve the problem of stain generation at the edge of a film having a nanostructure on the front surface. Also, Patent Literatures 4 and 5 each disclose that a moth-eye structure allows contaminants such as fingerprints to penetrate the film through the capillary action. The inventions disclosed in Patent Literatures 4 and 5 each are designed to have hydrophilicity on the front surface thereof to allow easy wiping of contaminants, but are not designed to reduce generation of contamination itself or spread of the contaminants (capillary action between the projections in the moth-eye structure).

Meanwhile, in the actual manufacturing setting, even a stain that can be removed by peeling off the protective film is desired to be prevented. For example, in the case that the manufacturer (distributor) and the user (purchaser) of optical films are different, a product with a stain is regarded as a defective product.

The present invention was made in view of the above current state of the art, and aims to provide an optical element which prevents a contaminant component adhering to the edge thereof from spreading through the capillary action and thus from forming a stain; and a display device including the element.

Solution to Problem

The inventor has made various studies on methods for preventing stains at the edge of a base material provided with projected portions at a pitch equal to or shorter than the wavelength of visible light. As a result, the inventor has found that preventing a contaminant component from entering the base material from the side surface is important. The inventor has then found that generation of a stain can be prevented by covering at least one of the edge and side surface of the base material with a material that does not penetrate gaps between the projected portions to fill the gaps between the projected portions in the vicinity of the side surface. In this manner, the inventor has solved the above problem, thereby arriving at the present invention.

That is, one aspect of the present invention may be an optical element including: a base material including a front surface provided with projected portions at a pitch equal to or shorter than the wavelength of visible light, and a side surface surrounding the front surface; and a covering material covering at least one of an edge of the front surface and the side surface, the covering material filling gaps between the projected portions.

Another aspect of the present invention may be a display device including the above optical element.

Advantageous Effects of Invention

The optical element and display device of the present invention can prevent a contaminant component adhering to the edge of the optical element from spreading through the capillary action and thus from forming a stain.

DESCRIPTION OF EMBODIMENTS

Hereinafter, the embodiments of the present invention are described with reference to the drawings. The present invention is not limited to the following embodiments. Also, the configurations of the embodiments may be appropriately combined or modified within the spirit of the present invention.

Embodiment 1

Embodiment 1 relates to an optical element for which ink is used as a covering material.

(1) Structure and Function of Optical Element.

Figure 1:
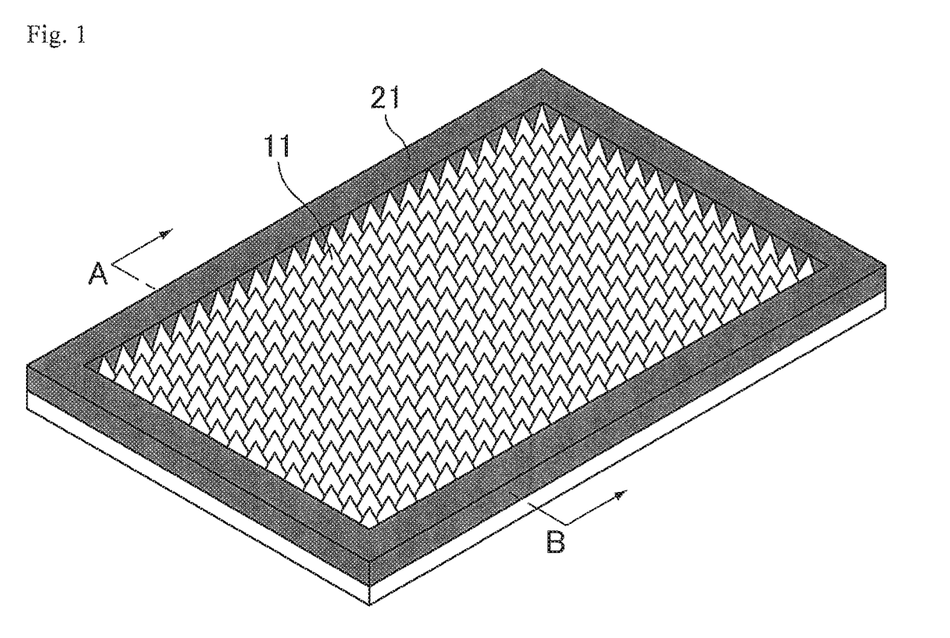
FIG. 1 is a perspective view schematically illustrating an optical element of Embodiment 1.
Figure 2:
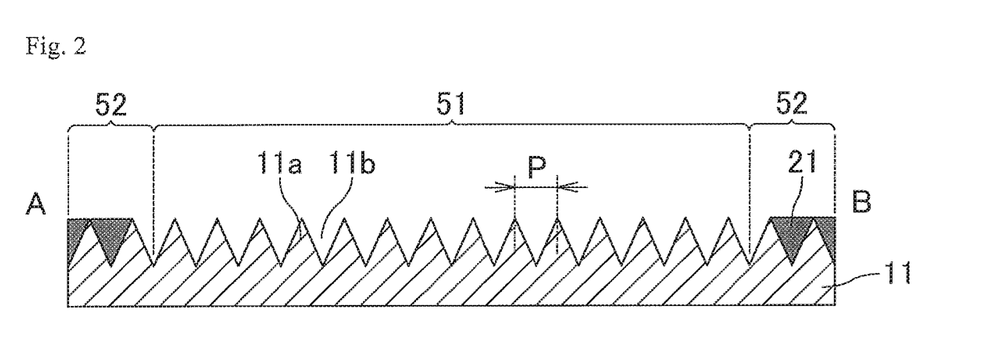
FIG. 2 is a schematic cross-sectional view illustrating an enlarged view of a cross section taken along the AB line in FIG. 1.

The structure of the optical element of Embodiment 1 is described with reference to FIG. 1 and FIG. 2. FIG. 1 is a perspective view schematically illustrating an optical element of Embodiment 1. FIG. 2 is a schematic cross-sectional view illustrating an enlarged view of a cross section taken along the A-B line in FIG. 1. As illustrated in FIG. 1 and FIG. 2, the optical element of Embodiment 1 includes a film-like base material 11 provided on the front surface with projected portions (projections) 11a at a pitch (distance between the tops of the projected portions) P equal to or shorter than the wavelength of visible light. That is, the optical element of Embodiment 1 corresponds to an anti-reflection film having a structure that resembles eyes of a moth (hereinafter, also referred to as a "moth-eye structure") on the front surface (hereinafter, such a film is also abbreviated as a "moth-eye film"). FIG. 1 and FIG. 2 each illustrate the film enlarged in the cross-sectional direction so as to clearly show the moth-eye structure. In an actual film, the ratio of the height (lower than 1 µm) of the moth-eye structure to the area of the film is significantly low, and thus the moth-eye structure cannot actually be recognized as illustrated in FIG. 1 and FIG. 2 by the naked eye.

The height of the projected portions (projections) 11a constituting the moth-eye structure is not particularly limited. Still, the lower limit thereof is preferably 150 nm while the upper limit thereof is preferably 180 nm or lower. The pitch (distance between the tops of the projections) P may be any pitch equal to or shorter than the wavelength (780 nm) of visible light. The lower limit thereof is preferably 100 nm while the upper limit thereof is preferably 200 nm. The shape of the projected portions 11a may be any shape such as a substantially circular cone shape (cone-like shape). The projected portions 11a are preferably randomly disposed on the front surface of the base material. From the viewpoint of forming such projected portions 11a, the suitable material of the base material 11 is a resin.

Figure 3:
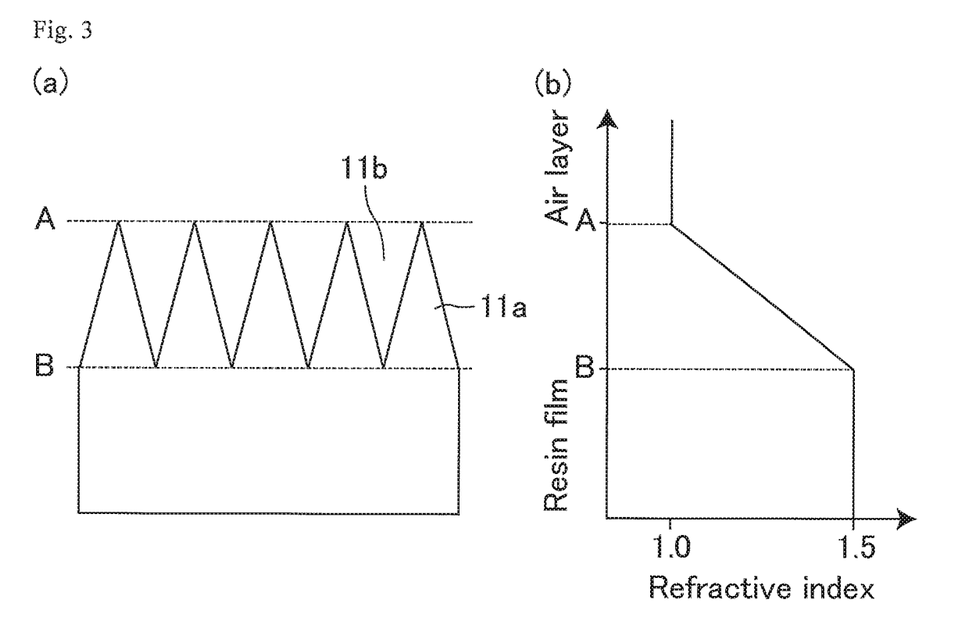
FIG. 3 includes views for describing the principle of how the optical element of Embodiment 1 can reduce the reflectance, with the view (a) illustrating a cross section of a moth-eye structure and the view (o) schematically illustrating changes in refractive index in the cross section of the moth-eye structure.

The percentage (visible light reflectance) of reflection of incident visible light in the interface between the air layer and the resin film having not been subjected to an anti-reflection treatment is typically 4%. This visible light reflectance can be reduced to about 0.15% by disposing a moth-eye film on a resin film. The reason therefor is described with reference to FIG. 3. FIG. 3 includes views for describing the principle of how the optical element of Embodiment 1 can reduce the reflectance, with the view (a) illustrating a cross section of a moth-eye structure and the view (b) schematically illustrating changes in refractive index in the cross section of the moth-eye structure. Since the projected portions 11a constituting the moth-eye structure are smaller than the wavelength (380 to 780 nm) of visible light, the visible light behaves differently at the time of passing through a moth-eye structure interface from the behavior at the time of passing through a typical flat interface. That is, when the refractive index in the moth-eye structure region is calculated based on the volume ratio of the projected portions 11a made of a resin with a refractive index of 1.5 to the recessed portions (gaps between the projected portions 11a) made of the air having a refractive index of 1.0, the refractive index in the moth-eye structure region continuously increases from 1.0 in the air layer to 1.5 in the resin film as illustrated in the view (b) of FIG. 3. This means that an interface with a discontinuously changing refractive index does not exist for visible light that passes through the air layer having a refractive index of 1.0 (the region above the dotted line A in the view (a) of FIG. 3), the region having a moth-eye structure (the region between the dotted line A and the dotted line B in the view (a) of FIG. 3), and the base material 11 consisting entirely of a resin film having a refractive index of 1.5 (the region below the dotted line B in the view (a) of FIG. 3). For this reason, the moth-eye structure significantly reduces interfacial reflection. Although the view (b) of FIG. 3 illustrates the case where the material constituting the base material 11 has a refractive index of 1.5, the moth-eye structure similarly eliminates an interface with a discontinuously changing refractive index even when the refractive index of the material is not 1.5.

In the optical film of Embodiment 1, the region including the moth-eye structure and not including a covering material is used as a low-reflection region 51. In an outer peripheral region (corresponding to the edge of the front surface of the base material 11 provided with the projected portions 11a) 52 surrounding the low-reflection region 51, an ink 21 is disposed as the covering material. The ink 21 is disposed on the base material 11 to fill recessed portions 11b. Although the ink 21 covers both the edge of the front surface of the base material 11 provided with the projected portions 11a and the side surface (upper half) of the base material 11 in FIG. 1, the ink 21 may cover only one of the edge and the side surface.

The studies made by the inventor show that in a conventional moth-eye film without the ink 21 (e.g. the film illustrated in FIG. 11), the gaps between the projected portions of the moth-eye structure function as the capillaries, allowing contaminants adhering to the edge of the film or the side surface of the base material 11 to spread within the film, deteriorating the reflectance-reducing effect of the moth-eye structure. In the present embodiment, the ink 21 prevents contaminant components adhering to the outer peripheral region 52 or the side surface of the base material 11 from entering the low-reflection region 51. Thereby, the present embodiment can improve the handleability of the optical element and enables the optical element to function sufficiently.

Examples of the ink 21 include ink containing at least one of a pigment and a dye. The ink 21 can be one for markers or one for industrial stamps. The markers may be washable markers or permanent markers. Examples of the markers include Shatihata stamp pad inks "SG-40" and "SG-240" and Shachihata stamp pad refill inks "SGN-40" and "SGN-240" from Shachihata Inc. (all of these containing carbon black); TAT indelible ink <all, surfaces> black or red, namely "STG", "STG-1", and "STG-3", from Shachihata Inc. and black ink for Mckee Pro DX "YYS10-EK" from Zebra. Co., Ltd. (all of these containing a pigment); Mckee series from Zebra Co., Ltd. (all of these containing a dye); and Sian Pens from Pentel Co., Ltd.

Since the reflectance-reducing effect of the moth-eye structure cannot be achieved in the outer peripheral region 52 in which the ink 21 is disposed, the width of the outer peripheral region 52 (distance from the side surface of the base material 11) is preferably narrow. The lower limit of the width of the outer peripheral region 52 may be set to any value that allows practical prevention of contamination.

The optical element of Embodiment 1 may have a hydrophilic or water-repellent front surface. A hydrophilic front surface enables easy removal of a contaminant adhering to the front surface by wiping with water, while a water-repellent front surface enables easier prevention of a contaminant adhering to the front surface from spreading on the front surface.

In order to prevent sebum components from spreading through the capillary action and thus from forming a stain, the front surface of the base material 11 including the projected portions 11a preferably has a contact angle with water of 100° or greater. In a region in which the contact angle with water is 100° or greater, contaminant components can be removed easily and cleanly by wiping with an organic solvent such as isopropyl alcohol (IPA). In this case, the lower limit of the contact angle with water is preferably 105°, more preferably 110°. The upper limit of the contact angle with water is preferably 150°, more preferably 140°.

The contact angle with water can be achieved by selecting a material having a contact angle within the above specific range as the material of the base material 11. For example, in the case of forming a moth-eye structure by transferring the surface shape of a mold onto a resin (also referred to as a transfer resin), a resin with hydrophobicity after being cured (hydrophobic resin) can be used as the transfer resin. Also, the contact angle may be adjusted to the above specific range by surface treatment.

The contact angle can be measured by, for example, dropping a droplet (1 μl) on the measurement target surface and measuring the contact angle by the θ/2 method (half-angle method). The measurement device can be, for example, a portable contact angle meter (trade name: PCA-1) from Kyowa Interface Science Co., Ltd.

In order to prevent a butadiene-based plasticizer component from spreading through the capillary action and thus from forming a stain, the front surface of the base material 11 including the projected portions 11a preferably has a contact angle with hexadecane of 20° to 100°. For an ultraviolet-curable resin for panel attachment, a butadiene-based plasticizer can be used, and this butadiene-based plasticizer is the substance that spreads through the capillary action to form a stain in a conventional moth-eye film. Hence, the film is designed to have a contact angle with hexadecane of 20° to 100° at the edge thereof, so that the butadiene-based plasticizer, even when adhering to the edge of the base material 11, can be prevented from spreading on the base material 11. Also, the lower limit of the contact angle with hexadecane is preferably 25°, more preferably 30°. The upper limit of the contact angle with hexadecane is preferably 90°, more preferably 40°.

The contact angle with hexadecane can be achieved by selecting a material having a contact angle in the above specific range as the material of the base material 11, or by adjusting the contact angle to the above specific range by surface treatment.

(2) Process for Manufacturing Optical Element.

Figure 4:
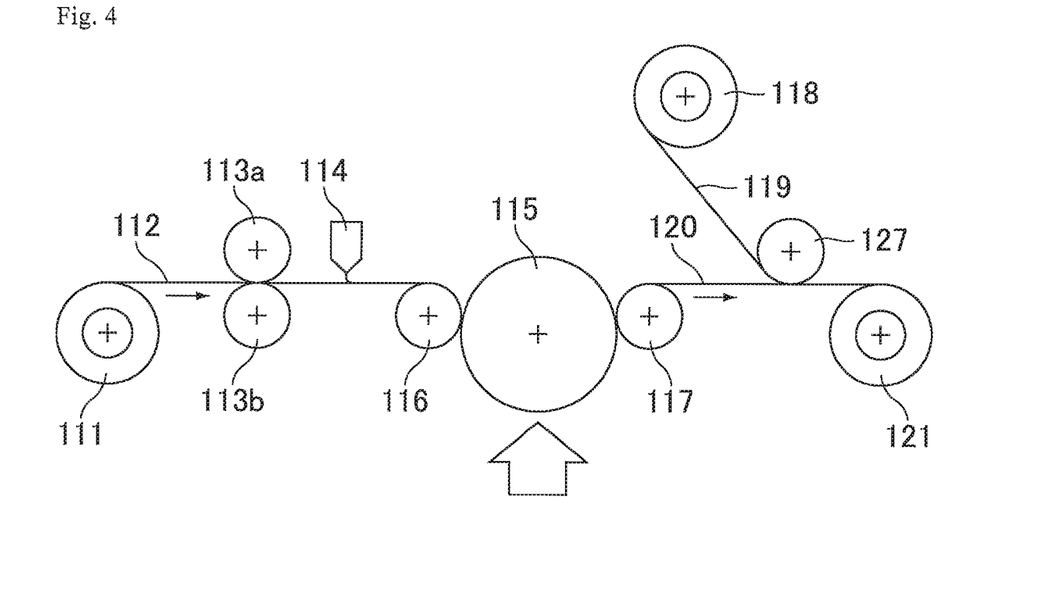
FIG. 4 is a cross-sectional view illustrating the overall configuration of a roller nanoimprinter used to produce the optical element of Embodiment 1.

A method utilizing nanoimprinting is described as an example of the method for manufacturing the optical element of Embodiment 1 with reference to FIG. 4. FIG. 4 is a cross-sectional view illustrating the overall configuration of a roller nanoimprinter used to produce the optical element of Embodiment 1.

In the first stage, a moth-eye film is produced. The suitable method for producing a moth-eye film is a method including, as illustrated in FIG. 4, applying an ionizing-radiation-curable resin such as an ultraviolet-curable resin to provide a moth-eye structure to a base material film 112 using an application instrument such as a die coater or a slit coater; bringing the ionizing-radiation-curable resin into contact with a mold roll 115; and irradiating the ionizing-radiation-curable resin with energy rays such as ultraviolet rays to cure the resin. Rotating the mold roll 115 about a cylindrical or pillar axis enables continuous processing of pressing the mold onto the transfer target and releasing the mold from the transfer target. As a result, the method enables mass manufacture of a moth-eye film 120 having a moth-eye structure on the front surface at a high speed.

The roller nanoimprinter is described in more detail. A base material film roll 111 which is a roll of the base material film 112 is rotated first, so that the base material film 112, which has a belt-like shape, is transported from the base material film roll 111 in the direction indicated by the arrows in FIG. 4. The material of the base material film 112 is, for example, triacetyl cellulose (TAC) or polyethylene terephthalate (PET).

Next, the base material film 112 is passed between pinch rolls (retention rolls) 113a and 113b in pairs designed to control the tension, and is subjected to application of an ionizing-radiation-curable resin such as an ultraviolet-curable resin by a die coater 114. Then, the base material film 112 is moved by half a cycle along the outer periphery of the pillar-shaped mold roll 115. Here, the ionizing-radiation-curable resin applied to the base material film 112 is in contact with the outer periphery of the mold roll 115.

At the position where the base material film 112 first comes into contact with the outer periphery of the mold roll 115, a pillar-shaped pinch roll 116 made of rubber is disposed to face the outer periphery of the mold roll 115. At this position, the mold roll 115 and the pinch roll 116 hold the base material film 112 between them so that the mold roll 115 and the ionizing-radiation-curable resin are pressurized and brought into close contact with each other. Thereby, the projection and recess pattern formed on the outer periphery of the mold roll 115 is transferred to the ionizing-radiation-curable resin.

The base material film 112, while being moved along the outer periphery of the mold roll 115, is irradiated with energy rays such as ultraviolet rays from the side under the mold roll 115. As a result, the ionizing-radiation-curable resin is cured in the state of having the inverted pattern of the projection and recess pattern formed on the outer periphery of the mold roll 115. The white arrow in FIG. 4 indicates the radiation direction of the energy rays.

After being moved by half a cycle along the outer periphery of the mold roll 115, the base material film 112 is moved along a pinch roll 117 disposed to face the outer periphery of the mold roll 115 so as to be removed from the mold roll 115, together with a film of the ionizing-radiation-cured resin. In this manner, the moth-eye film 120 including the ionizing-radiation-cured resin with a continuous moth-eye structure is produced on the base material film 112.

Subsequently, a lamination film (protective component) 119, supplied by a lamination film roll 118 which is a roll of the lamination film 119, is attached by a pinch roll 127 to the ionizing-radiation-cured resin side of the moth-eye film 120. Thereby, the moth-eye film 120 and the lamination film 119 are brought into sufficiently close contact with each other. The lamination film 119 is a protective, film temporarily attached to prevent contaminants from adhering to the front surface of the moth-eye film 120 or from scratching the front surface. Covering the front surface of the moth-eye film 120 with the lamination film 119 shields the front surface of the moth-eye film 120 from the external substances. Lastly, a laminated film of the moth-eye film 120 and the lamination film 119 which are in close contact with each other is rolled into a laminated film roll 121.

In the second stage, a covering process of applying the ink 21 as a covering material is performed. The covering process includes, for example, applying the ink 21 to the moth-eye film 120 produced by cutting the laminated film roll 121 into a predetermined size. The method for applying the ink 21 may be any method such as direct application to the edge of the moth-eye film 120 using an application instrument such as a marker or brush, or application by spraying. Also, the ink 21 may be applied after the formation of the moth-eye structure and before attachment of the lamination film 119. The ink 21 can be applied with good workability when it is applied to the side surface of a roll of the moth-eye film 120.

The covering process may be performed on each film, or may be performed on each unit of films (e.g. units of 100 films) for easy mass processing.

Embodiment 2

Figure 5:
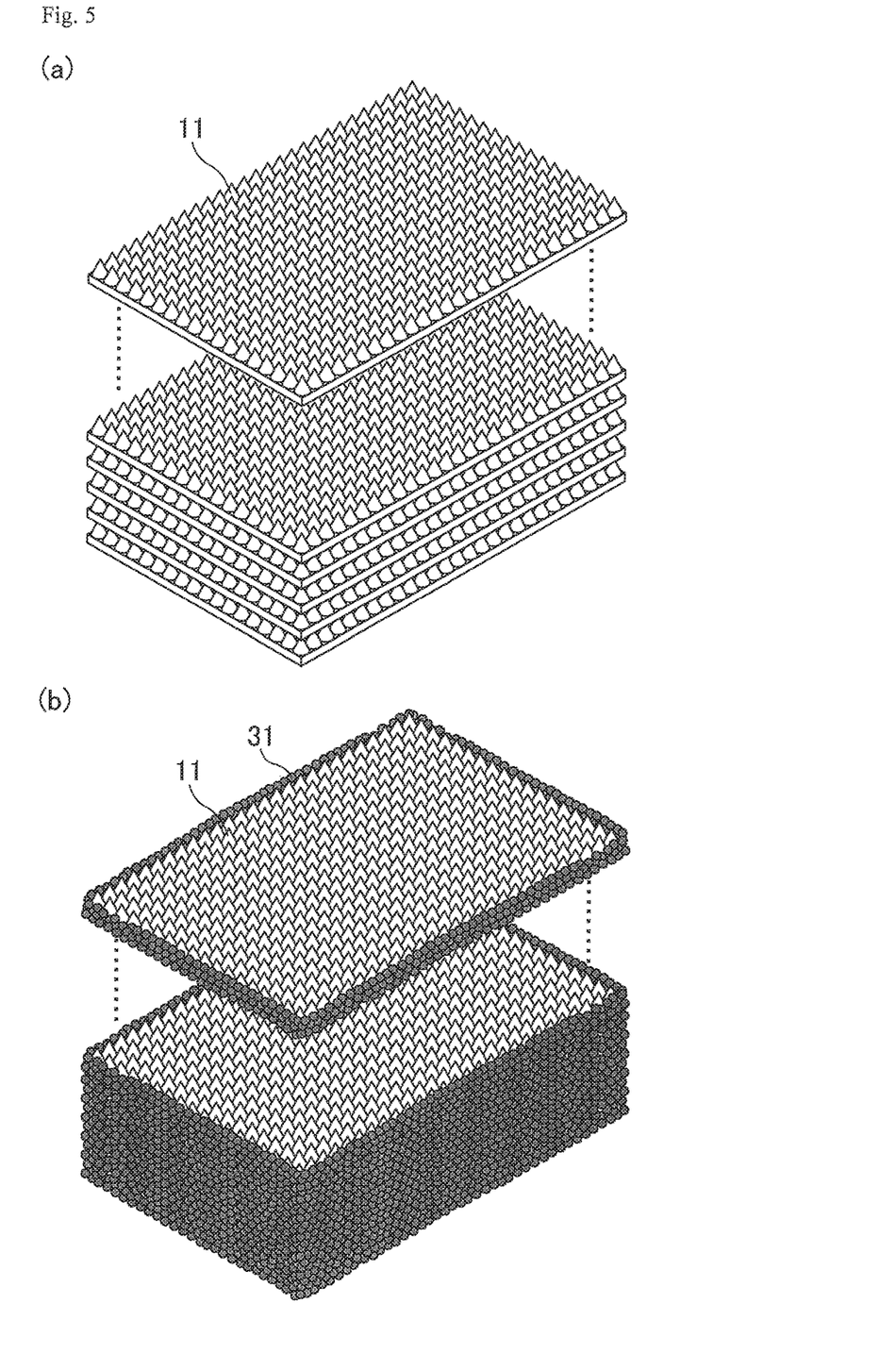
FIG. 5 includes perspective views for describing processing of allowing fine powder to adhere to an optical element of Embodiment 2, with the view (a) schematically illustrating the state before the processing and the view (b) schematically illustrating the state after the processing.

Embodiment 2 relates to an optical element containing fine powder (fine particles) as the covering material. FIG. 5 includes perspective views for describing processing of allowing fine powder to adhere to an optical element of Embodiment 2, with the view (a) schematically illustrating the state before the processing and the view (b) schematically illustrating the state after the processing. As illustrated in the view (a) of FIG. 5, since the moth-eye structure on the side surface (edge surface) of the unprocessed moth-eye film is exposed, contaminants (sebum or the ultraviolet-curable resin) can adhere to the side surface. Such contaminants are likely to penetrate the film toward the center of the film through the capillary action of the moth-eye structure, and thus to be perceived as a stain. In contrast, covering the side surface with fine powder 31 as illustrated in the view (b) of FIG. 5 prevents sebum or ultraviolet-curable resin from penetrating the film and thus from forming a stain.

The fine powder 31 may suitably be any powder with a small surface energy, such as a fluorine-based material. Any fine powder 31 with a small surface energy, even in a small adhesion amount, repels sebum and other external substances that can adhere to the film, thereby providing a large effect of preventing substances such as contaminants from entering the moth-eye structure. Examples of the fluorine-based material include polytetrafluoroethylene (PTFE).

Examples of the method for covering with the fine powder 31 include spraying. In the case of spraying, an aerosol spray (fluorine-coating agent) containing fluorine-based fine particles is suitable, for example. The solvent of a fluorine-coating agent is an alcohol-containing volatile material which is relatively easily applied or disposed at the edge of a film. Specific examples of the fluorine-coating agent include "Sumilon Powder Spray" from Sumico Lubricant Co., Ltd. which is formed as a spray by processing PTFE powder with an extremely small amount of special oil. Also, a mixture of PTFE powder with an adhesive resin may be used. The adhesive resin can be, for example, ultraviolet-curable polydimethyl siloxane (silicone rubber).

The technique of covering the side surface with the fine powder 31 may be a method that causes the fine powder 31 to adhere only to the side surface, or may be, in the case that the front and back surfaces of the film each are covered with a protective film, a method that sprays powder to the entire film and removes the excess powder.

The covering process may be performed on each film, or may be performed on each unit of films (e.g. units of 100 films) as illustrated in FIG. 5 for easy mass processing. In the case of performing the process on each unit of films, the films having been subjected to the covering process may stick to each other, causing a problem in a subsequent process to be performed on each film. For example, a device configured to feed each film of a stack of 100 films may be used in the step of attaching a moth-eye film to a polarizing plate. At this time, if two or three moth-eye films sticking to each other are fed, the moth-eye films would be wasted. Such a feeding defect can be due to static electricity generated between films or due to sticking of films caused by an adhesive covering material bonded in the covering process. In contrast, in the method that causes the fine powder 31 (fluorine-based material) to adhere to the side surface of the film, the fine powder 31 itself is not sticky, and is therefore suitable for avoiding the feeding defect.

The optical element of Embodiment 2 can have the same configuration as that of Embodiment 1 except for the use of fine powder (fine particles) as the covering material, and can be manufactured by the same method.

Modified Example

In Embodiments 1 and 2, ink and fine powder (fine particles) are respectively used as the covering material. The covering material may be any material that does not spread by penetrating the gaps between projected portions (nanostructured projections) provided at a pitch equal to or shorter than the wavelength of visible light. A quick-drying material is suitable. For example, "TUFFY" series which are moisture-proof insulating materials (ultraviolet-curable resins), namely "TF-4200EB-452" and "TF-3348-100B", from Hitachi Chemical Co., Ltd. can be used. The resin used as the covering material is preferably substantially free from non-reactive additives. The "non-reactive additives" refer to additives which are not taken into the polymer backbone in the curing reaction of the resin constituting the covering layer. A non-reactive additive, being not bonded to or hardly bonded to the polymer backbone, can form a stain. The expression "substantially free from" means that the amount of the additive(s) does not lead to formation of a stain. Examples of the non-reactive additives include specific kinds of plasticizer such as a butadiene-based plasticizer. Accordingly, examples of the resin substantially free from non-reactive additives include resins free from a plasticizer.

Although a moth-eye film is used as the optical element in Embodiments 1 and 2, the optical element may be any element provided on the front surface with projected portions at a pitch equal to or shorter than the wavelength of visible light. That is, the surface structure of the optical element may be a nanostructure other than the moth-eye structure, such as a wire-grid structure. Also, the optical element may have any thickness, and thus may be a film, a sheet, or a structure other than these.

[Use of Optical Element]

The use of the optical element of the present invention may be any use such as display device use. The display device may be any display device such as a liquid crystal display device. In the case that a conventional optical element is applied to a liquid crystal display device, a stain (reflection unevenness) may be generated when an ultraviolet-curable resin (sealing material) for liquid crystal panel attachment adheres to the edge of the optical element. In contrast, in the case that the optical element of the present invention is applied to a liquid crystal display device, the element can prevent generation of a stain even when the sealing material adheres to the edge of the element.

EXPERIMENTAL EXAMPLES

The moth-eye films described in Embodiments 1 and 2 can be attached to the display surface of the liquid crystal display device for prevention of glare of external light. In such a use, the ultraviolet-curable resin (sealing material) for liquid crystal panel attachment may adhere to the edge of the optical element to form a stain (reflection unevenness) on the optical element. Hence, in the following Experimental Examples 1 and 2, experiments were performed to confirm that the covering material, depending on its material, can prevent spread of a stain when the ultraviolet-curable resin is brought into contact with the front surface (Experimental Example 1) or side surface (Experimental Example 2) of the moth-eye film.

Experimental Example 1

Figure 6:
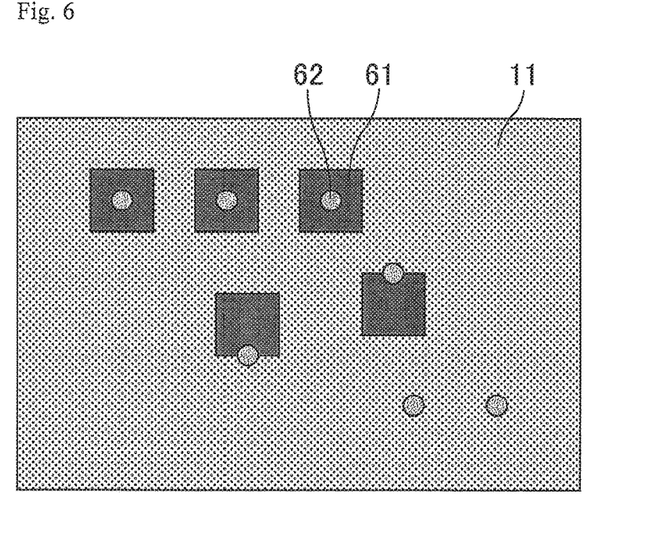
FIG. 6 is a schematic plan view illustrating the state of a first sample in Experimental Example 1.
Figure 7:
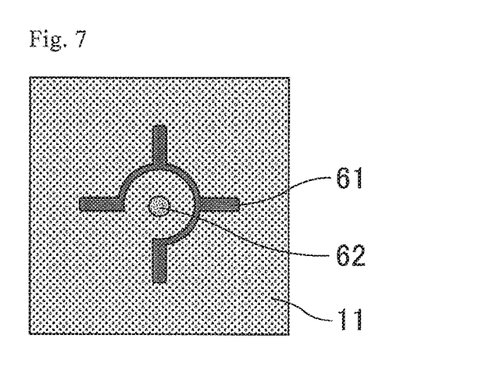
FIG. 7 is a schematic plan view illustrating the state of a second sample in Experimental Example 1.

In Experimental Example 1, an ultraviolet-curable resin (Kyoritsu Chemical & Co., Ltd., trade name: "HRJ") was used as a substance forming a stain, and a permanent marker (Zebra Co., Ltd., trade name: "Mckee", black) was used as a material of the covering material. FIG. 6 is a schematic plan view illustrating the state of a first sample in Experimental Example 1. As illustrated in FIG. 6, a first sample was produced which includes parts formed by directly dropping ultraviolet-curable resin 62 on the front surface of the base material 11 of a moth-eye film, and parts formed by marking the front surface of the base material 11 of the moth-eye film with the permanent marker to form parts 61 and dropping the ultraviolet-curable resin 62 on the parts 61. The first sample was left to stand at room temperature for 24 hours in a laboratory. FIG. 7 is a schematic plan view illustrating the state of a second sample in Experimental Example 1. As illustrated in FIG. 7, a second sample was produced by drawing a pattern of a ¾ circle as the part. 61 marked with the permanent marker and a ¼ circle left as a part not marked with the permanent marker, and dropping the ultraviolet-curable resin 62 at the center of the pattern. The second sample was left to stand at room temperature for 24 hours in a laboratory.

Figure 8:
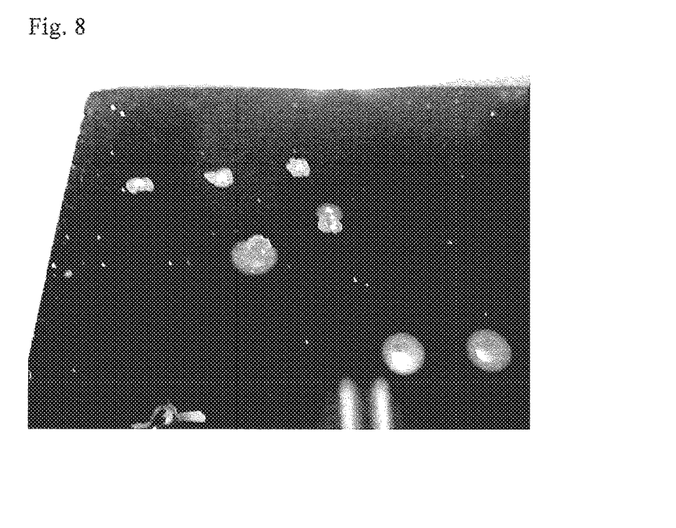
FIG. 8 is a photograph showing the state of the first sample after standing.

FIG. 8 is a photograph showing the state of the first sample after standing. As illustrated in FIG. 8, in the parts formed by directly dropping the ultraviolet-curable resin 62 on the front surface of the moth-eye film, the ultraviolet-curable resin 62 spread by penetrating the gaps between the projections in the moth-eye structure, and formed stains around the parts. In contrast, in the parts formed by dropping the ultraviolet-curable resin 62 on the parts 61 marked with the permanent marker, the ultraviolet-curable resin 62 remained in the parts 61 marked with the permanent marker and caused no spread of stains around the parts 61.

Figure 9:
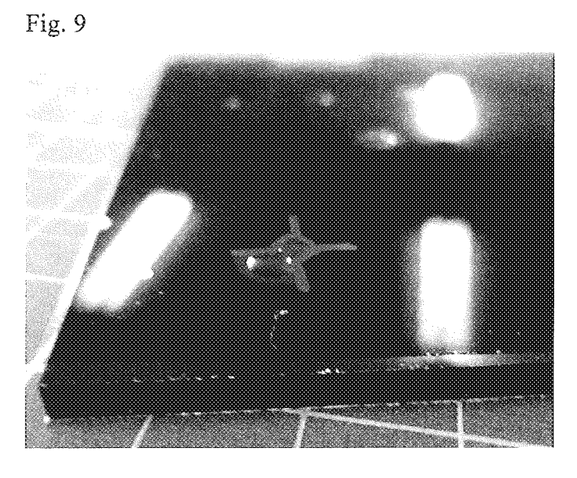
FIG. 9 is a photograph showing the state of the second sample after standing.

FIG. 9 is a photograph showing the state of the second sample after standing. As illustrated in FIG. 9, in the ¾ circle, the ultraviolet-curable resin 62 remained in the part 61 marked with the permanent marker, whereas the ultraviolet-curable resin 62 leaked only from the ¼ circle part not marked with the permanent marker to spread therearound. In the region where the ultraviolet-curable resin 62 spread, stains were generated. Also, the leaked ultraviolet-curable resin 62 was prevented from further spreading along the part 61 marked with the permanent marker.

The results of Experimental Example 1 show that marking with a permanent marker can prevent the ultraviolet-curable resin 62 from spreading and thus from forming a stain, not only on the side surface but also on the front surface of the moth-eye film.

Experimental Example 2

Figure 10:
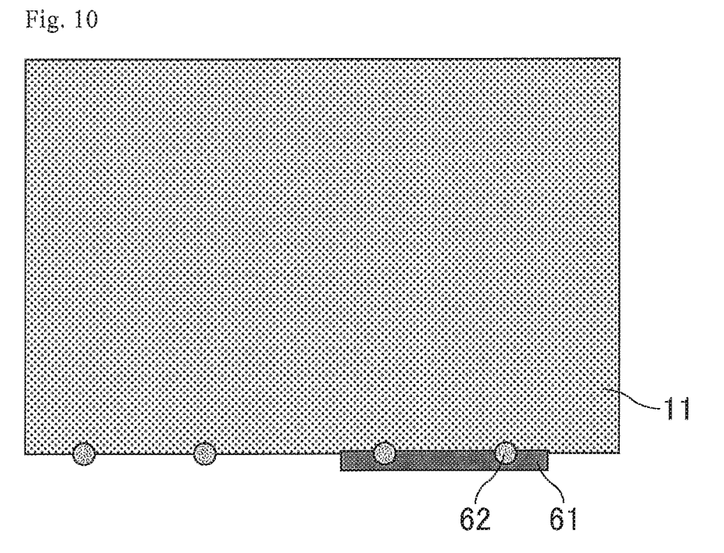
FIG. 10 is a schematic plan view illustrating the state of a sample in Experimental Example 2.

In Experimental Example 2, an ultraviolet-curable resin (Kyoritsu Chemical & Co., Ltd., trade name: "HRJ") was used as a substance forming a stain, and a permanent marker (Zebra Co., Ltd., trade name: "Mckee", black) was used as the material of the covering material, as in Experimental Example 1. Also in Experimental Example 2, a laminated film of a moth-eye film and a lamination film (PET film) in sufficiently close contact with each other was used. FIG. 10 is a schematic plan view illustrating the state of a sample in Experimental Example 2. As illustrated in FIG. 10, spread of stains from the side surface of the moth-eye film was compared between the parts covered with the permanent marker and the parts not covered with the permanent marker. The procedure of the comparison was as follows. First, the moth-eye film was attached to a black acrylic plate, and parts of the side surface of the moth-eye film were marked with the permanent marker. The marking was performed by drawing and tracing the patterns with the permanent marker 10 times (drawing back and forth 5 times) on the side surface of the moth-eye film. Next, a bulk of the ultraviolet-curable resin (half-cured) placed on a small polyethylene terephthalate (PET) film was brought into contact with each of the parts covered with the permanent marker and parts not covered with the permanent marker on the side surface of the moth-eye film. Then, the sample was left to stand at room temperature for 24 hours in a laboratory. The bulk of the ultraviolet-curable resin was removed, and the moth-eye film was observed in the state where the lamination film was peeled off.

As a result of the comparison, the ultraviolet-curable resin components penetrated the side surface and thus the stains widely spread in the parts not covered with the permanent marker. More specifically, a 5.0 mm×1.8 mm (width×depth from the side surface) stain and a 4.0 mm×2.0 mm (width× depth from the side surface) stain were observed. In contrast, no stain was generated in the parts covered with the permanent marker. The results of Experimental Example 2 also show that covering the side surface of a moth-eye film with a permanent marker can prevent the ultraviolet-curable resin from spreading on the side surface of the moth-eye film and from forming stains.

[Additional Remarks]

Hereinafter, preferred modes of the optical element of the present invention are described. The modes may be appropriately combined within the spirit of the present invention.

The covering material may be ink. In this mode, stains caused by a nanostructure can be sufficiently prevented. Examples of the ink include an ink containing a dye and an ink containing a pigment.

The covering material may contain fluorine-based fine particles, and the fluorine-based fine particles may cover the side surface of the base material. In this mode, stains caused by a nanostructure can be sufficiently prevented. Also, since the fine particles themselves are not adhesive, even when the covering process is performed on each unit of multiple films, a feeding defect in a subsequent process can be prevented.

The covering material may be a resin free from a plasticizer. In this mode, stains caused by a nanostructure can be sufficiently prevented. Specific kinds of plasticizer such as a butadiene-based plasticizer are not bonded to or hardly bonded to the polymer backbone, and thus can form a stain.

Preferably, the optical element further includes a protective component that covers the front surface of the base material, and the protective component shields the front surface of the base material from external substances. The front surface of the base material in the optical element on which a nanostructure is formed is preferably covered with a protective component to prevent, damages or contamination. However, in the case of conventional optical elements, a stain generated by a nanostructure is inhibited by a protective component from disappearing. In the optical element of the present invention, a stain generated by a nanostructure can be sufficiently prevented even when a protective component is used.

The front surface of the base material preferably has a contact angle with water of 100° or greater. Such a front surface can prevent generation of a stain even when sebum adheres to the front surface.

The front surface of the base material preferably has a contact angle with hexadecane of 20° to 100°. Such a front surface can prevent generation of a stain even when a butadiene-based plasticizer, possibly contained in ultraviolet-curable resins for panel attachment, adheres to the front surface.

REFERENCE SIGNS LIST

11: base material
11a: projected portion (projection)
11b: recessed portion
21: ink
31: fine powder
51: low-reflection region
52: outer peripheral region
61: part marked with permanent marker
62: ultraviolet-curable resin
111: base material film roll
112: base material film
113a, 113b, 116, 117, 127: pinch roll
114: die coater
115: mold roll
118: lamination film roll
119: lamination film
120: moth-eye film
121: laminated film roll
P: pitch (distance between tops of projected portions)

The invention claimed is:

1. An optical element including a moth-eye film comprising:
   a base including a front surface provided with projected portions at a pitch equal to or shorter than the wavelength of visible light, wherein the projected portions cover substantially the front surface, the front surface including a first region which is an outer peripheral region corresponding to an edge of the front surface, and surrounding a second region which is a central low-reflection region of the front surface, a back surface opposite the front surface and a side surface between and perpendicular to the front surface and the back surface, and surrounding the front surface and the back surface; and
   fluorine-based fine particles covering substantially the first region of the front surface and covering the side surface of the base with no gap left, wherein
   gaps between the projected portions in the first region of the front surface of the base are substantially filled by the fluorine-based fine particles, and gaps between the projected portions in the uncovered second region of the front surface of the base are not filled, and the pitch between tops of the projected portions is 100 nm or longer and 200 nm or shorter, and wherein
   the fluorine-based fine particles are smaller than the pitch between tops of the projected portions.

2. The optical element according to claim 1,
   further comprising a peelable lamination film that is attached to the front surface of the base,
   wherein the peelable lamination film shields the front surface of the base from external substances.

3. A display device comprising
   the optical element according to claim 1.

4. The optical element according to claim 1, wherein the base is made of resin.

* * * * *